Jan. 13, 1959     A. ROBINSON     2,868,908
LOW PRESSURE INDICATOR FOR AUTOMOTIVE VEHICLE TIRES
Filed July 11, 1958
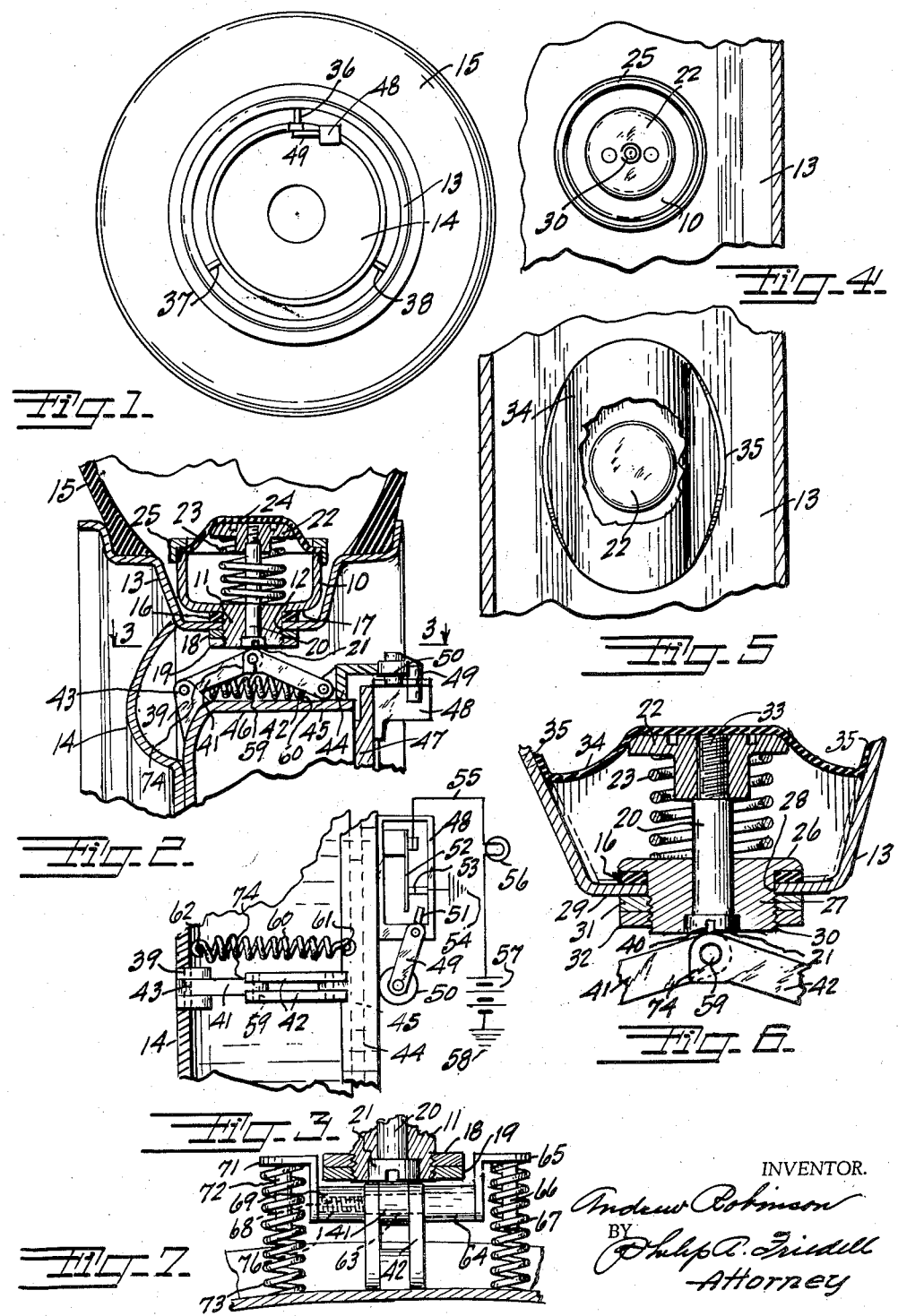
INVENTOR.
Andrew Robinson
BY Philip A. Friedell
Attorney

United States Patent Office 2,868,908
Patented Jan. 13, 1959

2,868,908

LOW PRESSURE INDICATOR FOR AUTOMOTIVE VEHICLE TIRES

Andrew Robinson, Oakland, Calif.

Application July 11, 1958, Serial No. 747,932

6 Claims. (Cl. 200—61.25)

This invention relates to improvements in means for indicating any drop in pressure below a predetermined minimum in any of the tires on a traveling automotive vehicle, the indication being by either visual or audible means, electrically operated.

This invention can be applied to either, tube or tubeless tires and will operate perfectly with either type of tire, and there is no possibility of loss of air in either type.

It is known that systems have been developed for indicating the pressure in running tires, but so far as known, they are operated through a maze of passages by the air within the tire, and which could result in complete deflation of the tire in the event of breakage or rupture of a tube or wear of air transfer portions of the circuit, while my invention is controlled solely by the pressure within the tire and using none of the air nor providing any means of escape, since the invention is sealed against the air in the tire.

The objects and advantages of the invention are as follows:

First, to provide means for indicating a drop in pressure below a predetermined minimum in any of the tires on a traveling automotive vehicle.

Second, to provide means as outlined which is controlled solely by the existent pressure within the tire.

Third, to provide means as outlined which is positively sealed against the air within the tire so as to provide no means for the escape of air.

Fourth, to provide means as outlined which is applicable to both, tube and tubeless tires.

Fifth, to provide means as outlined which does not interfere with normal removal and replacement of tires or tubes.

In describing the invention reference will be had to the accompanying drawings, in which:

Fig. 1 is a side elevation of a wheel and tire of an automotive vehicle with my invention applied thereto.

Fig. 2 is a fragmentary enlarged view shown in section through the rim portion of the wheel with the invention shown in vertical transverse section, and as positioned when the pressure in the tire has dropped below a predetermined value.

Fig. 3 is a fragmentary plan view taken on line 3—3 of Fig. 2.

Fig. 4 is a top plan view of the pressure responsive element with the diaphragm removed.

Fig. 5 is a top plan view of a modification for installation in tube tires, though suitable for both, tube and tubeless tires, with a portion of the diaphragm broken out to show the head and spring seat of the operating plunger.

Fig. 6 is a transverse sectional elevation through the invention as adapted to tube tires while also being suitable for tubeless tires, and is shown on a greatly enlarged scale.

Fig. 7 is an end view shown partly in section of a modification in which the ring retracting springs cooperate with the knuckle.

The invention is adaptable to any automotive vehicle having either tube or tubeless tires, and is shown in two types, one of which is suitable only for tubeless tires while the other type can be used with either, tube, or tubeless tires, the variation between the two types residing in the method of application of the diaphragm.

The pressure responsive element for tubeless tires is illustrated in Figs. 2, 3 and 4 and consists of a housing 10 which is provided with a hub 11 at its lower end and which passes through a passage 12 provided in the rim 13 of the wheel 14 on which the tire 15 is mounted.

A resilient gasket such as rubber is interposed between the bottom 17 of the housing and the web of the rim as indicated at 16, and a pair of locknuts 18, 19 are threaded onto the lower end of the hub and drawn up tightly to provide a perfect seal to prevent any escape of air from the tire.

A plunger 20 is slidable in a bore provided axially through the hub and terminates at its lower end in a head 21, and a spring cap 22 is threaded or otherwise secured on the upper end of the plunger, and a compression spring 23 is interposed between the spring cap and the bottom of the housing.

A diaphragm 24 formed of flexible material is secured to the top of the housing and covers the spring cap, and may be secured in any suitable manner such as by the threaded ring 25.

The pressure responsive element so far described would not be suitable for tube tires because of the recesses about the housing which could readily rupture the tube, though ideally suited to tubeless tires.

The pressure responsive element illustrated in Figs. 6 and 5 can be used with either, tube or tubelss tires, being identical in all respects with the exception of elimination of the side walls of the housing to provide instead, a disc 26 having the hub 27 for insertion in the passage 28 provided in the web 29 of the rim, this hub likewise terminating in a threaded portion 30 for the locknuts 31 and 32, with the resilient washer 16 interposed between the disc and the face of the web of the tire rim to provide the perfect seal against escape of air from the tire.

The plunger 20 is identical with that illustrated in Fig. 2, having the head 21 at the lower end and being threaded at the upper end as indicated at 33 to receive the spring cap 22, the spring 23 being likewise interposed between the spring cap and the disc.

To substitute for the side walls of the housing and the threaded clamping ring, the diaphragm is enlarged as indicated at 34 and sealed to the inner surface of the tire rim as indicated at 35, thereby protecting an inner tube from being ruptured.

Three of these pressure responsive elements are required for each tire, and are equi-angularly spaced as indicated at 36, 37 and 38 in Fig. 1.

Ears 39 are fixed on the back of the brake drum in registrable relation with the pressure responsive elements 36, 37 and 38. The heads 21 of the plungers are suitably arranged for holding during application of the spring caps, such as by a screw driver slot 40.

The knuckle links 41 and 42 have one end pivoted respectively in the ear as indicated at 43 and to the ring 44 as indicated at 45, the switch control ring 44 encompassing the brake drum and being slidable thereon, the brake drum being indicated at 46.

Mounted on the wall 47 of the inner brake member is a switch box 48 having a lever 49 pivoted therein and having a roller 50 at its terminal end cooperative with the ring, and having a finger 51 at the other end for cooperation with the switch arm 52 to open the switch when the tire pressure is above the predetermined minimum, and permit the switch to close when the tire pressure drops below the predetermined minimum. When the tire pressure is low, the finger frees the switch arm to make contact at 53 to complete circuit from ground 54, through conductor 55 to lamp 56, battery 57 to ground 58, the signaling device such as the lamp 56 being operated to indicate low pressure in the tire. Any other signaling device may be used and preferably located on the instrument panel of the automotive vehicle.

Two different systems are illustrated for retracting the switch control ring when the tire pressure is low. In Figs. 1 and 2, the knuckle links are pivoted together as indicated at 59 by a conventional pin, and a tension spring 60 has its terminal ends connected respectively to the switch control ring at 61 and to the brake drum at 62. Obviously with this arrangement, the pivot 59 must not be lowered to a plane passing through the axes of the pivots 43 and 45.

The arrangement illustrated in Fig. 7 is more satisfactory as the knuckle links cannot become locked as in the previously described arrangement. This arrangement has the links 41 and 42 which are conventionally pivoted to the ear 39 and ring 44. Instead of the conventional center pivot, an extension pivot is provided, with each extension having a spring cap and pilot, the pivot 63 being integral with the hub 64 and spring cap 65 which is provided with a pilot 66 for retaining the compression spring 67.

The pivot is provided with a shoulder 68 with the terminal portion threaded to screw into the hub 69 as indicated at 70, and this hub has an integral spring cap 71 provided with a pilot 72 for the compression spring 73. Thus the center connection of the links is continually urged upward for retraction of the ring. However the upward movement is limited by the cooperative shoulders 74 to just reach the retracted head of the plunger to permit removal of the wheel from the brake drum without affecting the ring control mechanism.

The initial tension of the combination of springs, 23 and 60, or, 23, 67, and 73 is substantially equal to the reaction against the pressure exerted on the diaphragm required to retract the switch control ring when the tire pressure drops below a predetermined minimum.

When the tire is inflated to normal pressure, the plunger is advanced, forcing the knuckle down to contact with the brake drum, advancing the switch control ring and terminating operation of the signaling device.

I claim:

1. A low-pressure indicator for automotive vehicle tires, in combination; a wheel having a tire rim having a web, a brake drum and a cooperative brake member, a pressure-responsive element mounted in each of three equiangularly spaced locations on said web and each having a plunger projecting through the web, switch control means comprising a switch control ring slidable axially on said brake drum and including means cooperative between said ring and said brake drum for advancing said ring, said plungers being cooperatively related to said means cooperative, springs cooperative between the brake drum and said switch control means normally urging retraction of said ring, said pressure-responsive element including spring means for retracting the plunger for retraction of the ring by said springs when the existent pressure on the element drops below a predetermined value, and projecting the plunger through the existent pressure higher than said predetermined value for operation of said means cooperative for advancing said ring, and a switch and a circuit therefor, said switch being mounted on said cooperative brake member and having means cooperative with said ring for braking circuit when said ring is advanced and completing circuit when said ring is retracted.

2. A combination as defined in claim 1; said means cooperative comprising a bearing fixed on said brake drum, and a pair of knuckle links pivoted together at one end with the other ends respectively connected to said bearing and to said ring, with the plunger cooperatively related to the pivoted area at said one end.

3. A combination as defined in claim 1; said pressure-responsive element comprising a base having a hub having an axial bore, said plunger being slidable in said bore and including stop means for limiting retraction of the plunger, a spring cap for the upper end of said plunger and fixed thereon, a compression spring interposed between said base and said spring cap, and a flexible diaphragm cooperative with said spring cap and peripherally sealed to form an impervious enclosure for the element.

4. A combination as defined in claim 1; said means cooperative with said ring comprising a lever having a roller at one end for cooperation with said ring and having a finger at the other end for cooperation with said switch to open the switch when the ring is advanced and free the switch to close when the ring is retracted.

5. A combination as defined in claim 1; said means cooperative comprising a bearing fixed on said brake drum, and a pair of knuckle links pivoted together at one end with the other ends respectively connected to said bearing and to said ring, with the plunger cooperatively related to the pivoted area at said one end, said pressure-responsive element comprising a base having a hub having an axial bore with said plunger slidable in said axial bore and including means for limiting retraction of the plunger, a spring cap for the upper end of said plunger, a compression spring interposed between said base and said spring cap, and a flexible combined diaphragm and cover for said element, said flexible combined diaphragm and cover being cooperative with said spring cap and forming a sealed enclosure for the element.

6. In an automotive vehicle having a wheel having a tire rim including a web, and a tire mounted on said rim, a brake drum and a cooperative brake member, a pressure-responsive unit mounted within said tire and having a plunger projecting through a passage provided in said web and including first spring means for retracting said plunger, a switch control ring surrounding and axially slidable on said brake drum, and an operative connection between said brake drum and said switch control ring and including said spring means for normally urging retraction of said switch control ring on said brake drum, said plunger being operatively related to said operative connection for advancing said switch control ring through projection of said plunger, a switch mounted on said cooperative brake member and including means cooperative with said switch control ring for opening said switch when said switch control ring is advanced through projection of said plunger, with the switch closing when said plunger is retracted, a circuit controlled by said switch and including a signaling element and a source of potential, whereby, when the pressure in the tire is above a predetermined value, the plunger is projected and the ring advanced to maintain the switch in open position, and upon drop in pressure in the tire the first spring means retracts the plunger with the said second spring means retracting the switch control ring to release the switch for closing to provide a signal indicating low pressure in the tire.

References Cited in the file of this patent
UNITED STATES PATENTS

| | | |
|---|---|---|
| 2,113,957 | Androsky | Apr. 12, 1938 |
| 2,256,688 | Pierce | Sept. 23, 1941 |
| 2,447,777 | Slovack | Aug. 24, 1948 |